(12) United States Patent
Uesugi

(10) Patent No.: US 6,393,067 B1
(45) Date of Patent: May 21, 2002

(54) DIFFERENTIAL DETECTION RECEIVER

(75) Inventor: Mitsuru Uesugi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/356,494

(22) Filed: Jul. 19, 1999

Related U.S. Application Data

(63) Continuation-in-part of application No. 08/788,285, filed on Jan. 24, 1997, now Pat. No. 6,018,552.

(30) Foreign Application Priority Data

Mar. 6, 1996 (JP) ................................................. 8-75453

(51) Int. Cl.[7] ............................................... H03K 9/00
(52) U.S. Cl. ........................ 375/316; 375/330; 708/440
(58) Field of Search ................................. 375/330, 325, 375/322, 326, 346, 261, 329, 332, 344, 345, 349, 347, 331, 224, 271, 267, 279, 260; 708/212, 671, 440, 201, 207; 329/304

(56) References Cited

U.S. PATENT DOCUMENTS

| | | | |
|---|---|---|---|
| 4,445,224 A | | 4/1984 | Ihira et al. |
| 5,001,727 A | | 3/1991 | McDavid |
| 5,134,631 A | * | 7/1992 | Kingston et al. ............ 375/200 |
| 5,455,847 A | * | 10/1995 | Guilford et al. ............. 375/373 |
| 5,459,683 A | * | 10/1995 | Uesugi et al. ............... 708/605 |
| 5,657,354 A | * | 8/1997 | Thesling, III et al. ....... 375/332 |
| 5,703,526 A | * | 12/1997 | Meyer ......................... 329/304 |
| 5,832,041 A | * | 11/1998 | Hulyalkar .................... 375/340 |
| 5,844,943 A | * | 12/1998 | Kazecki et al. ............. 375/261 |

FOREIGN PATENT DOCUMENTS

| | | |
|---|---|---|
| GB | 2234411 | 1/1991 |
| JP | 7-58794 | 3/1995 |

* cited by examiner

*Primary Examiner*—Chi Pham
*Assistant Examiner*—Emmanuel Bayard
(74) *Attorney, Agent, or Firm*—Connolly Bove Lodge Hutz LLP

(57) ABSTRACT

A differential detection receiver with a reduced power consumption is provided by simplifying constituent circuits of the differential detection receiver. An arctangent calculator is realized without using an multiplier or a conversion table. Without using a D/A converter, a level adjusting circuit for adjusting the absolute value of a vector (Ax, Ay) given as input signals Ax and Ay so as to make it one. The power consumption of a differential detection demodulator is reduced by eliminating power consuming circuits such as a multiplier and a large conversion table from the system. There are disclosed some embodiments.

5 Claims, 12 Drawing Sheets

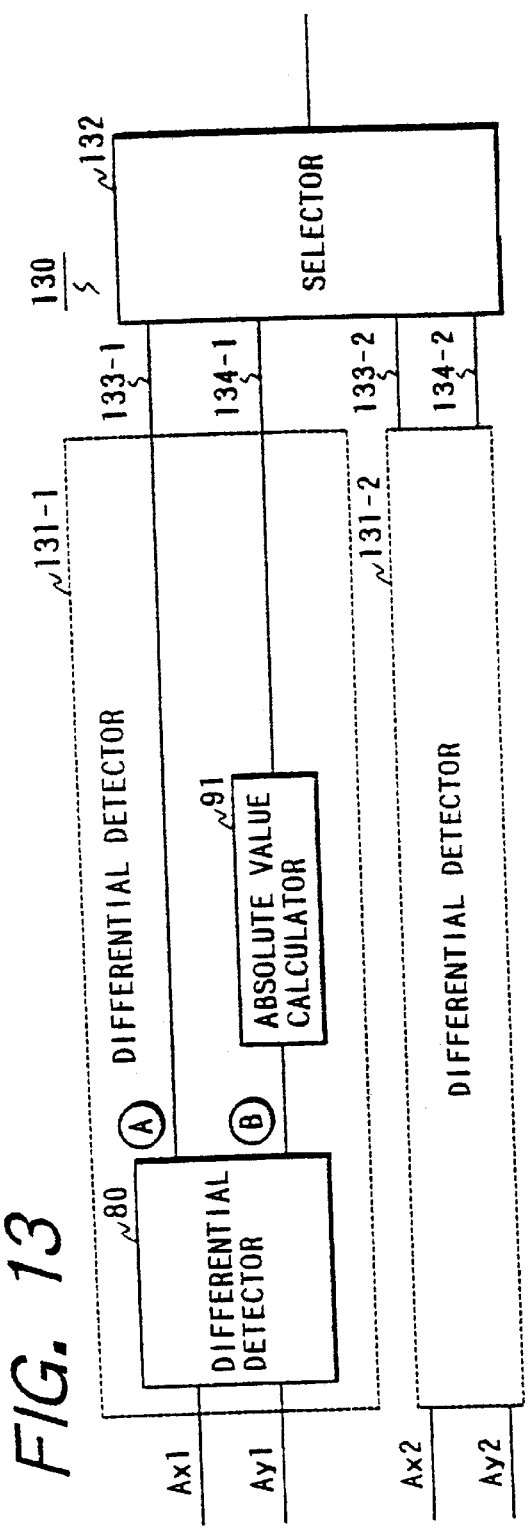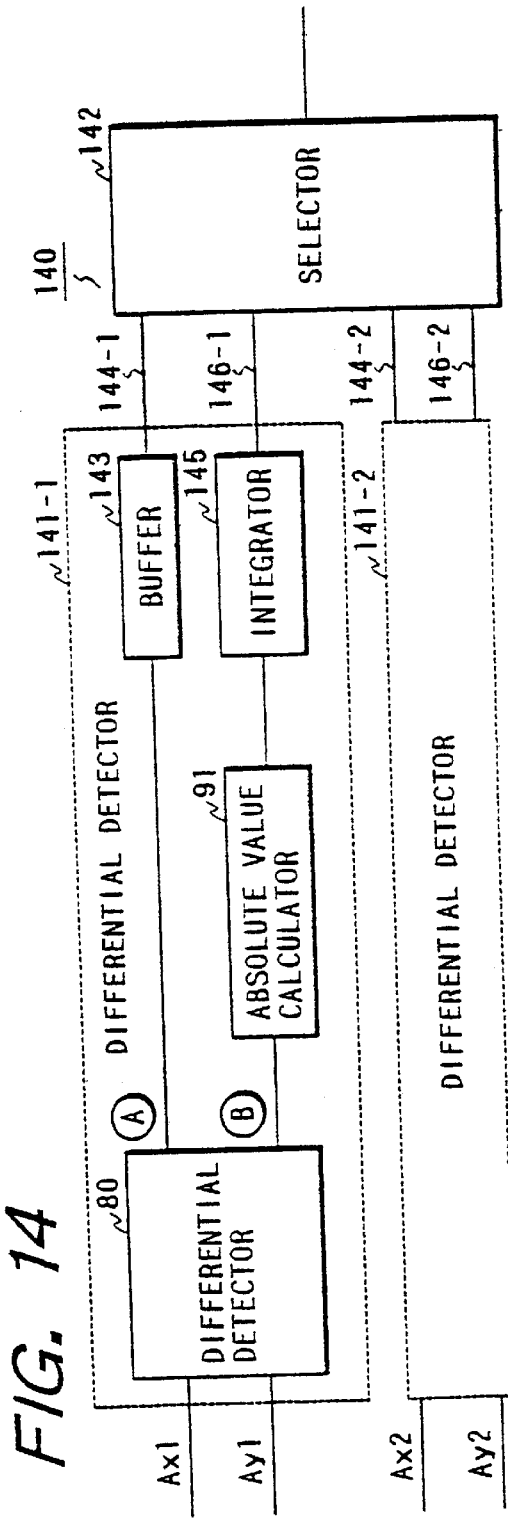

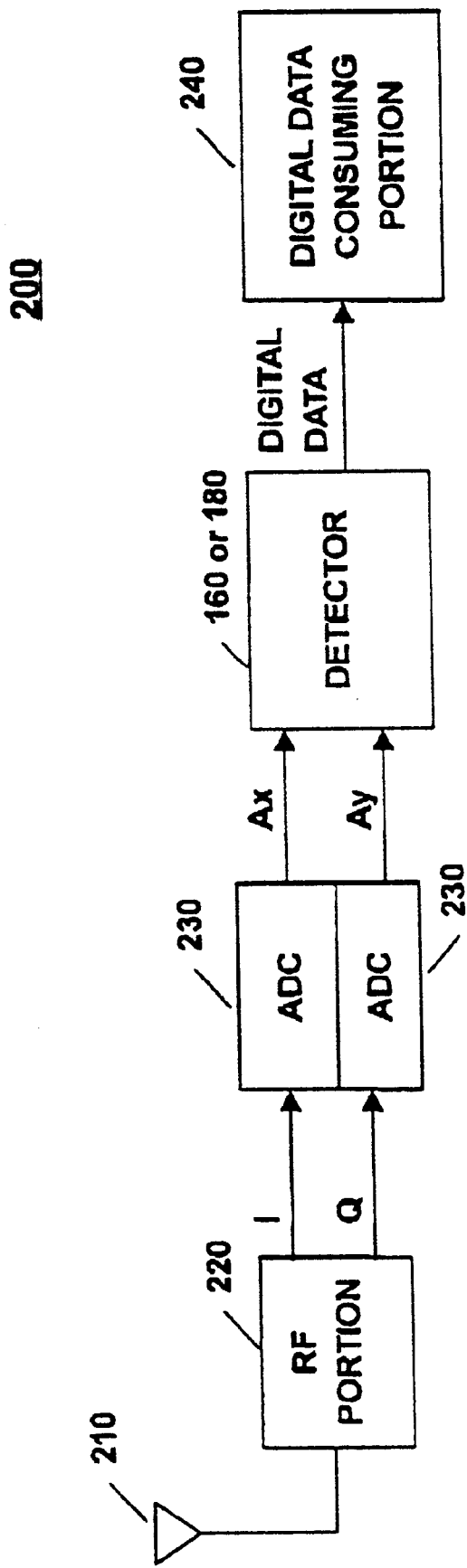

DIFFERENTIAL DETECTION RECEIVER

RELATED APPLICATIONS

This is a continuation-in-part application of U.S. patent application Ser. No. 08/788,285, in the name of Mitsuru Uesugi, filed Jan. 24, 1997 U.S. Pat. No. 6,018,552, hereby incorporated by reference.

BACKGROUND OF THE INVENTION

1. Field of the Invention

The present invention relates to a differential detection receiver used in a digital radio communication and, more specifically, to simplification of constituent circuits and the entirety of such a receiver.

2. Description of the Prior Art

In order to effectuate differential detection with a high precision in a digital circuit, it is a common practice to multiply a symbol in a signal with a just preceding symbol in the signal by using a multiplier and to subsequently perform an addition or subtraction operation to the obtained product. However, a multiplier requires a large scale circuit and accordingly a large amount of electric power, which is especially true if differential detection is to be achieved at a high speed. For this reason, in order to effectuate differential detection without using a multiplier, there is adopted a scheme in which differential information is detected by finding an arctangent ($\tan^{-1}$) of each symbol in a signal from a conversion table and calculating the difference between arctangents of adjacent symbols. Since this scheme fails to reduce the circuit size if the scheme requires a large conversion table, various techniques have been devised which eliminate the need of storing a lot of data in a conversion table.

Japanese Patent No. Sho62-549 (1987) discloses a digital arithmetic circuit which, for a given vector, calculates the magnitude thereof and the angle thereof with a reference coordinate as an inverse trigonometric function or an arctangent by using a reduced-size arctangent conversion table.

Japanese Patent No. Hei6-105,421 (1994) discloses a digital circuit for calculating an inverse trigonometric function or an arctangent of a 2n-bit binary number X. In this system, the calculation is achieved by utilizing the fact that if the binary number X comprises n higher digits H and n lower digits L (X=H+L), then the arctangent of X can be approximated as $$\arctan(X) = \arctan(H) + L/(H^2+1).$$

This system requires two conversion tables for arctan (H) and $1/(H^2+1)$ and a multiplier.

Further, in demodulating an input signal, the input signal needs level adjustment. In order to adjust the level of the input signal, the gain of an input signal amplifier is generally controlled by feeding back the result of comparison between a coded output and a reference level to the input signal amplifier.

Japanese Patent unexamined publication No. Hei1-71,270 (1989) discloses a level adjusting device of a just mentioned type. The disclosed device comprises a differential amplifier, an A/D converter, an LPF, a gate, a gate pulse generator, a subtracter, a nonlinear amplifier, an integrator and a D/A converter.

However, the above mentioned arctangent calculating circuits still require conversion tables and multipliers and the last mentioned device requires a D/A converter, which prevents the reduction in size and power consumption of the circuit. Thus, there remain in the prior art some room for improvement to reduce the size and the power consumption of constituent circuits of a differential detection receiver by further simplifying such circuits.

SUMMARY OF THE INVENTION

It is therefore an object of the invention to provide a differential detection receiver with a reduced power consumption by simplifying constituent circuits of the differential detection receiver.

According to an aspect of the invention, an arctangent calculator is realized without using a multiplier or a conversion table.

According to another aspect of the invention, there is realized without using a D/A converter, a level adjusting circuit for adjusting the absolute value of a vector (Ax, Ay) given as input signals Ax and Ay so as to make it one.

According to a further aspect of the invention, a differential detection demodulator with a reduced power consumption is realized by eliminating power consuming circuits such as a multiplier and a large conversion table from the system.

There are described some illustrative embodiments in which a differential detection demodulator has any combination of the features of line (or channel) quality estimation; an improved error rate by means of a soft decision error correction in a channel decoder; elimination of frequency error; improvement of demodulated signal by diversity reception; and demodulated data selection based on an integrated value of phase likelihoods.

BRIEF DESCRIPTION OF THE DRAWINGS

Further objects and advantages of the present invention will be apparent from the following description of the preferred embodiments of the invention as illustrated in the accompanying drawings. In the drawings:

FIG. 13 is a block diagram of a differential detection demodulator in a first diversity configuration in accordance with illustrative Embodiment 2G of the invention;

FIG. 14 is a block diagram of a differential detection demodulator in a second diversity configuration in accordance with illustrative Embodiment 2H of the invention;

FIG. 19 represents a receiving system capable of processing digital data in accordance with another embodiment of the invention.

DETAILED DESCRIPTION OF THE PREFERRED EMBODIMENTS

Embodiment 1A

Figure 1:
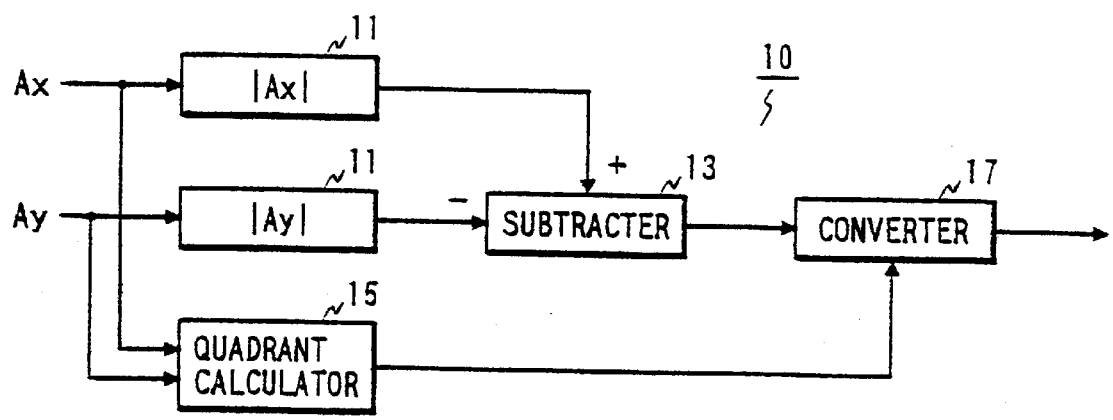
FIG. 1 is. a block diagram schematically showing an arctan (Ay/Ax) calculator in accordance with illustrative Embodiment 1A of the invention.

FIG. 1 shows a circuit for finding an inverse trigonometric function or arctan (Ay/Ax) for input signals Ax and Ay. Assume that Ax and Ay is x and y coordinates of a point (Ax Ay) on a Cartesian plane and that the polar coordinates are written $(1,\theta)$, that is, $Ax^2+Ay^2=1$. Then we obtain $$|Ax|-|Ay| \approx \begin{cases} -(4\theta/\pi)+1: & \text{the first quadrant} \\ (4\theta/\pi)-3: & \text{the second quadrant} \\ -(4\theta/\pi)-3: & \text{the third quadrant} \\ (4\theta/\pi)+1: & \text{the fourth quadrant} \end{cases} \quad (1)$$

Figure 2:
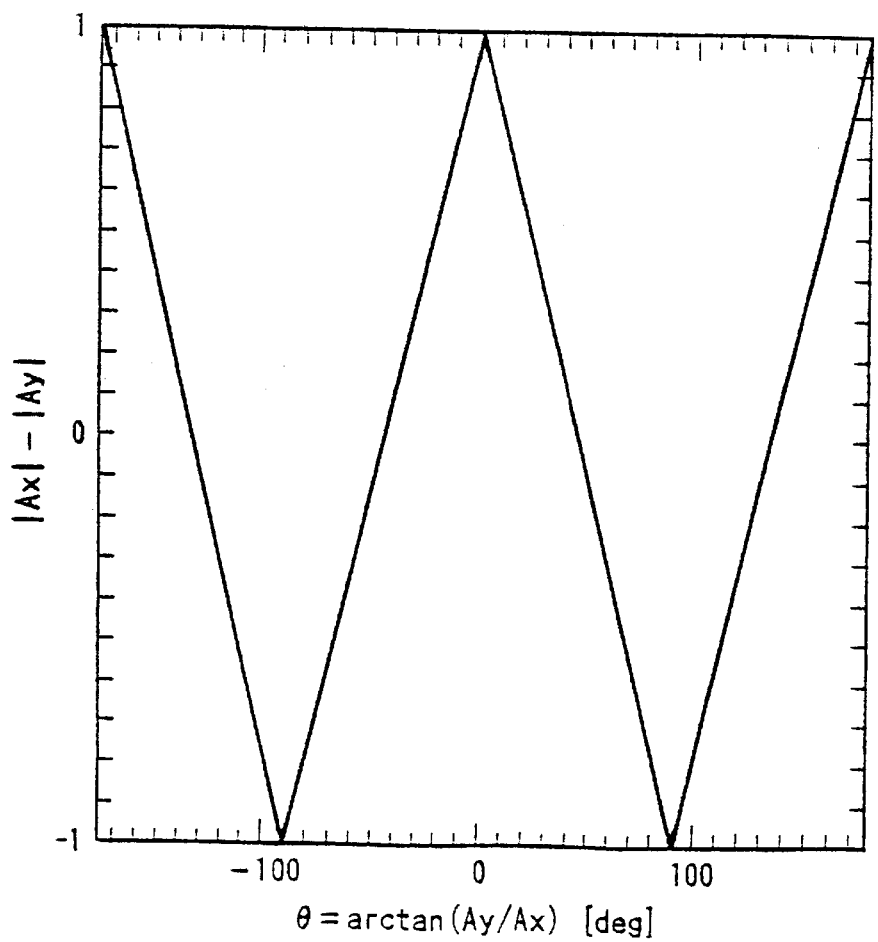
FIG. 2 is a diagram for explaining operation of the arctan (Ax/Ay) calculator of FIG. 1.

FIG. 2 shows a relationship between $|Ax|-|Ay|$ and arctan (Ay/Ax). As seen from FIG. 2, the relationship is substantially linear. Thus, the equation (1) gives a linear approximation to $|Ax|-|Ay|$, and the error between the both sides of equation (1) is at most about 1.8 degrees. The arctangent calculating circuit of FIG. 1 is realized based on equation (1).

In FIG. 1, the circuit 10 comprises absolute value calculators 11 for calculating the absolute values $|Ax|$ and $|Ay|$ of the elements Ax and Ay of a vector (Ax Ay), a subtracter 13 for subtracting the output of $|Ay|$ calculator 11 from the output of $|AX|$ calculator 11, a quadrant calculator 15 for deciding which quadrant the vector (Ax, Ay) lies in from the signs of Ax and Ay and a converter 17 for calculating the value of $\theta$ ($=$ arctan (Ay/Ax)) on the basis of the equation (1).

In operation, vector elements Ax and Ay are applied to the $|Ax|$ calculator 11 and the $|AY|$ calculator 11, which in turn output absolute values $|Ax|$ and $|AY|$, respectively. On receiving the absolute values, the subtracter 13 output the difference $|Ax|-|Ay|$ to the converter 17.

The vector elements Ax and Ay are also applied to the quadrant calculator 15, which determines a quadrant in which the vector (Ax, Ay) lies from the signs of the vector elements Ax and Ay to output quadrant information.

Then, the converter 17 can calculate $\theta$ from the difference $|Ax|-|Ay|$ according to the quadrant information.

Specifically, if the output of the subtracter 13 is written "Out13" (hereinafter, the output of element NN will be written like OutNN), then since $Out13=|Ax|-|Ay|$, $4\theta/\pi$ is obtained, for each quadrant, as follows:

$$4\theta/\pi = \begin{cases} -Out13+1 & \text{for the first quadrant} \\ Out13+3 & \text{for the second quadrant} \\ -Out13-3 & \text{for the third quadrant} \\ Out13-1 & \text{for the fourth quadrant} \end{cases}$$

Therefore, if the quadrant calculator 15 is so adapted as to output the values 1, 3, −3 and −1 in response to the first through fourth quadrants, respectively, then the converter 17 has only to add Out15 (the output of the quadrant calculator 15) to—Out13 if the vector (Ax, Ay) lies in the first or third quadrant, that is, Out15=1 or −3, and to Out13 if the vector (Ax, Ay) lies in the second or fourth quadrant, that is, Out15=3 or −1.

However, if the result of the calculation by the converter 17 is to be used for differential detection, it is more advantageous for a subsequent process to make the output in the form of a product with a power of 2 rather than make the output $\theta$ radian by multiplying $(4\theta/\pi)$ by $\pi/4$. A multiplication by a power of 2 is achieved only by bit shifting without the need of a hardware for multiplication.

As described above, the inventive circuit 10 calculates an arctangent without the need of a complicated circuit such as a multiplier or a conversion table, permitting a reduction of the size of the circuit 10. Therefore, adopting the circuit 10 in a system such as a receiver contributes to a reduction in the size and the power consumption of the system.

Embodiment 1B

Figure 3:
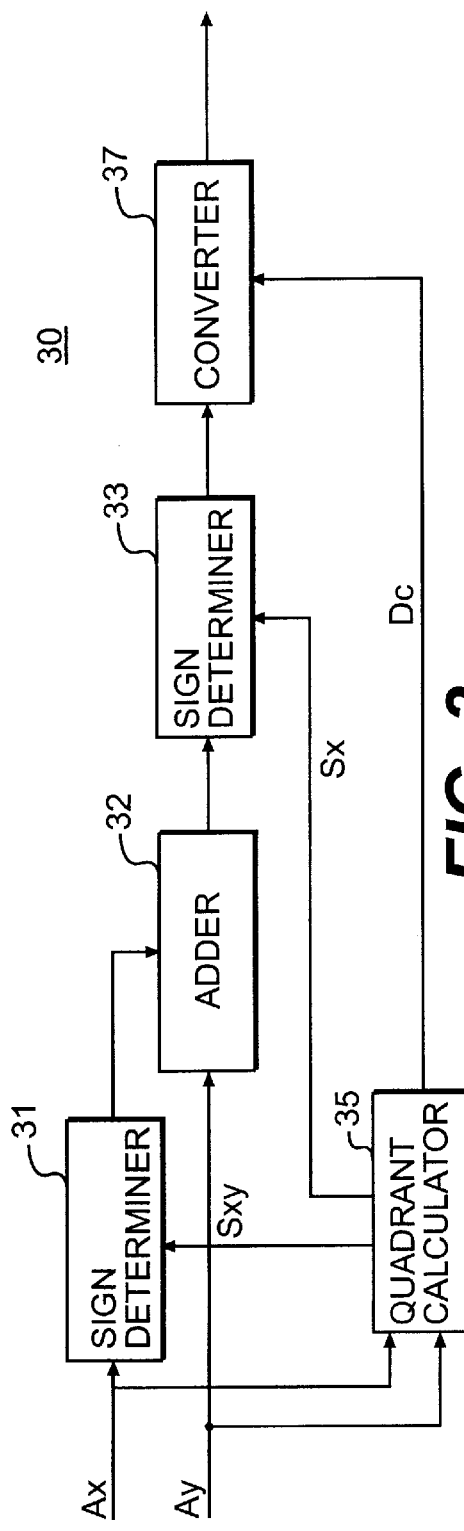
FIG. 3 is a block diagram schematically showing an arctan (Ay/Ax) calculator of illustrative Embodiment 1B of the invention.

FIG. 3 is a block diagram showing a conceptual arctan (Ay/Ax) calculator 30 of illustrative Embodiment 1B of the invention. The arctangent calculator 30 is based on the fact that the equation (1) may be written $$\begin{cases} Ay-Ax \approx -(4\theta/\pi)-1: & \text{the first quadrant} \\ -(4\theta/\pi)-3: & \text{the second quadrant} \\ Ay+Ax \approx -(4\theta/\pi)+3: & \text{the third quadrant} \\ (4\theta/\pi)+1: & \text{the fourth quadrant} \end{cases} \quad (2)$$

The accuracy of this approximation is of course the same as that of the equation (1).

In FIG. 3, the arctan (Ay/Ax) calculator 30 comprises a quadrant calculator 35 for generating first (Sxy) and second (Sx) control signals and control data (Dc) in response to sign bits of input signals Ax and Ay; a first sign determiner 31 for inverting the sign of an input signal Ax in response to the first control signal (Sxy); an adder 32 for adding the output of the first sign determiner 31 to the input signal Ay; a second sign determiner 33 for inverting the output of the adder 32 in response to the second control signal (Sx); and a converter 37 for calculating $\theta$ ($=$ arctan (Ay/Ax)) on the basis of the equation (2) by using the output of the second sign determiner 33 and the control data (Dc) from the quadrant calculator 35.

The first control signal (Sxy) is so arranged as to be logical "1" if the sign bits of Ax and Ay are identical to each other and otherwise "0". The second control signal (Sx) is the sign bit of Ax.

As seen from the above description, the output s of the adder 32 and the sign determiner 33, Out32 and Out33, respectively will result in Table 1.

TABLE 1

| Quadrant | Out32   | Out33    | Out33 = (from Eq (2)) |
|----------|---------|----------|------------------------|
| 1        | Ay − Ax | Ay − Ax  | (4θ/π) − 1             |
| 2        | Ay + Ax | −Ay − Ax | (4θ/π) − 3             |
| 3        | Ay − Ax | −Ay + Ax | (4θ/π) + 3             |
| 4        | Ay + Ax | Ay + Ax  | (4θ/π) + 1             |

Also, From the equation (2), the output of the sign determiner 33, Out33, equals a corresponding value in the column "Out33=" of the above table. Therefore, if the quadrant calculator 35 is so adapted as to output the values 1, 3, −3 and −1 in response to the first through fourth quadrants, respectively, then the converter 37 will have only to add the value from the quadrant calculator 35 to Out33 to yield 4θ/π.

Figure 4:
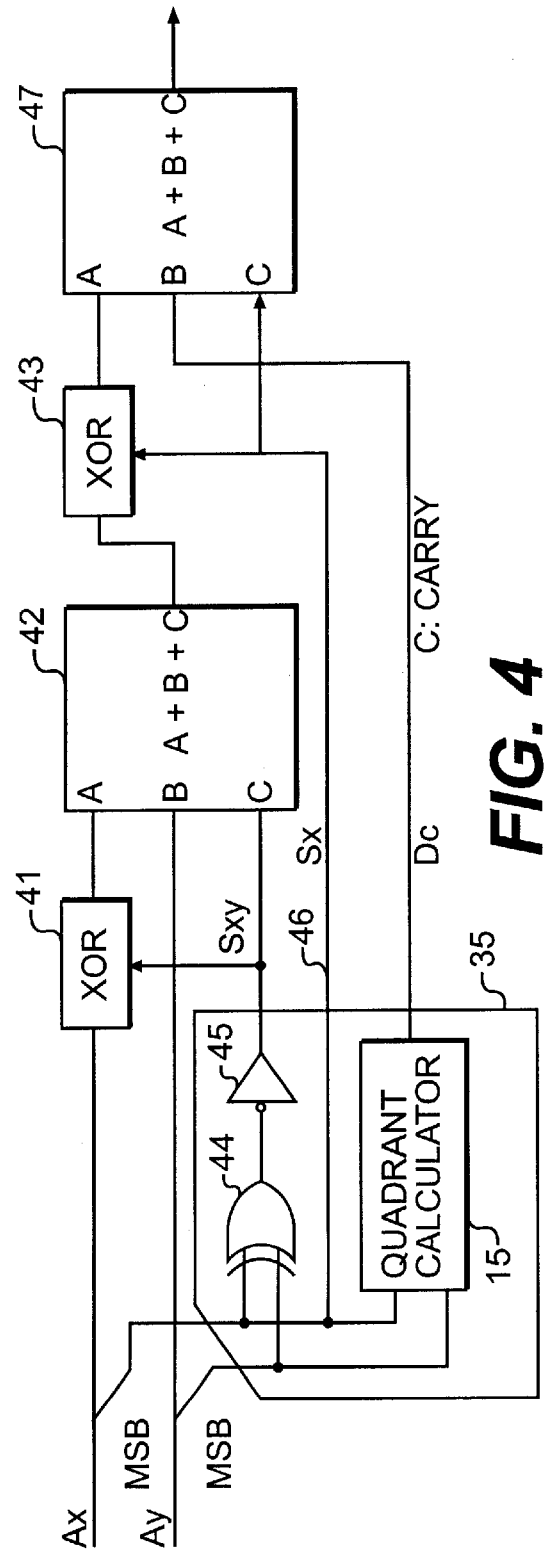
FIG. 4 is a block diagram showing in a more detailed form the arctan (Ay/Ax) calculator of FIG. 3.

FIG. 4 is a block diagram showing in a more detailed form an actual arctan (Ay/Ax) calculator of Embodiment 1B. In FIGS. 3 and 4, the same elements are denoted by same numerals. A combination of the elements 31 and 32 of FIG. 3 is realized by elements 41 and 42, and a combination of the elements 33 and 37 is realized by elements 43 and 47 in FIG. 4.

The element 35 is realized by a combination of an exclusive OR (XOR) gate 44 for XORing the sign bits (MSBs: the most significant bits) of the input signals Ax and Ay; an inverter 45 for inverting the output of the XOR gate 44; output line 46 connected to the sign bit line for Ax for supplying the abovementioned second control signal Sx; and the quadrant calculator 15 for supplying the values 1, 3, −3 and −1 for the first through fourth quadrants respectively, which is identical to that of FIG. 1.

The arctangent calculator 30 further comprises an XOR circuit 41 for supplying Ax as it is if Out45=0 and supplying the complement of Ax if Out45=1; an adder 42 for adding the XOR circuit 41 output, the input signal Ay, and the inverter 40 output (as a carry); an XOR circuit 43 for supplying the output of the adder 42 as it is if the MSB (the most significant bit) of Ax is 0 and supplying the complement of the adder 42 output if the MSB of Ax is 1; and an adder 47 for adding the XOR circuit 43 output, the quadrant calculator 15 output, and the MSB of Ax (as a carry bit).

In FIG. 4, each of the bold lines indicates a signal comprising a plurality of bits, and each of the fine lines indicates a single-bit line.

In operation, Out45 = 0 if the MSB of Ax = the MSB of Ay, 1 otherwise.

Out41 = Ax for Out45 = 0

$\overline{Ax}$ for Out45 = 1

Since A-input of the adder 42 (hereinafter, referred to like "In42A") equals Out41, In42C=Out45, and In42 B=Ay, then the output of the adder 42, that is, A+C+B is written:

$Ax + 0 + Ay = Ax + Ay$ if Out45 = 0

$\overline{Ax} + 1 + Ay = -Ax + Ay$ if Out45 = 1.

In the same way, the sum of XOR circuit 43 output and the sign bit (MSB) of the input Signal Ax, that is, (A+C) in the adder 47 yields, the values shown in the column "Out33" of Table 1. Since the quadrant calculator 15 supplies the values 1, 3, −3 and −1 in response to the first through fourth quadrants, respectively, then the adder 47 yields 4θ/π as is apparent from the column "Out33=" of Table 1.

Embodiment 2A

Figure 5:
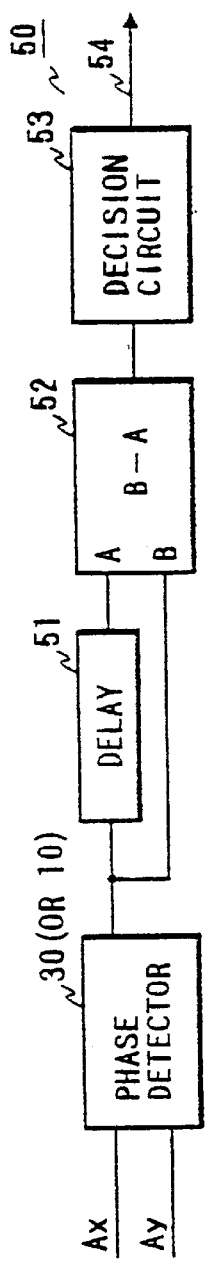
FIG. 5 is a block diagram of a differential detection demodulator in accordance with illustrative Embodiment 2A of the invention.

FIG. 5 is a block diagram of a differential detection demodulator incorporating an arctangent calculator 30 (or 10) in accordance with illustrative Embodiment 2A of the invention. In FIG. 5, the differential detection demodulator 50 comprises a phase detector or arctan Ay/Ax calculator 10 or 30 for detecting a polar coordinate θ of the vector (Ax, Ay), where Ax and Ay is given as input signals; a delay element 51 for delaying the output of the phase detector 51 by a time period of one symbol; a subtracter (B−A) 52 for calculating a difference between two adjacent outputs of the phase detector 30 (hereinafter, assumed to be 30 because the structure of FIG. 30 is more simple than and preferable to that of FIG. 10); and a decision circuit 53 for decoding the output of the subtracter 52.

The phase detector 30 has the structure shown in FIG. 3 or 4 and calculates 4θ/π. If the detector 30 provides 4θ/π in 8 bits, it means that the polar coordinate or phase is expressed with a resolution of 360/256 degrees. The delay circuit 51 delays the phase 4θ/π by a time period of one symbol. The subtracter 52 performs differential detection by subtracting the delay 51 output from the phase detector 30 output. Neglecting the carry bit in the subtraction has the effect of taking mod 2π.

The decision circuit 53 outputs the two upper bits of each of the subtracter 52 outputs as decoded data 54.

Embodiment 3A

In Embodiments 1A, 1B and 2A, it has been assumed that Ax$^2$+Ay$^2$=1. A level controller will be described which controls the absolute value of a vector whose elements are given as input signals to become 1 so that the level-controlled outputs Ax and Ay of the level controller can be processed as they are in subsequent circuit.

Figure 6:
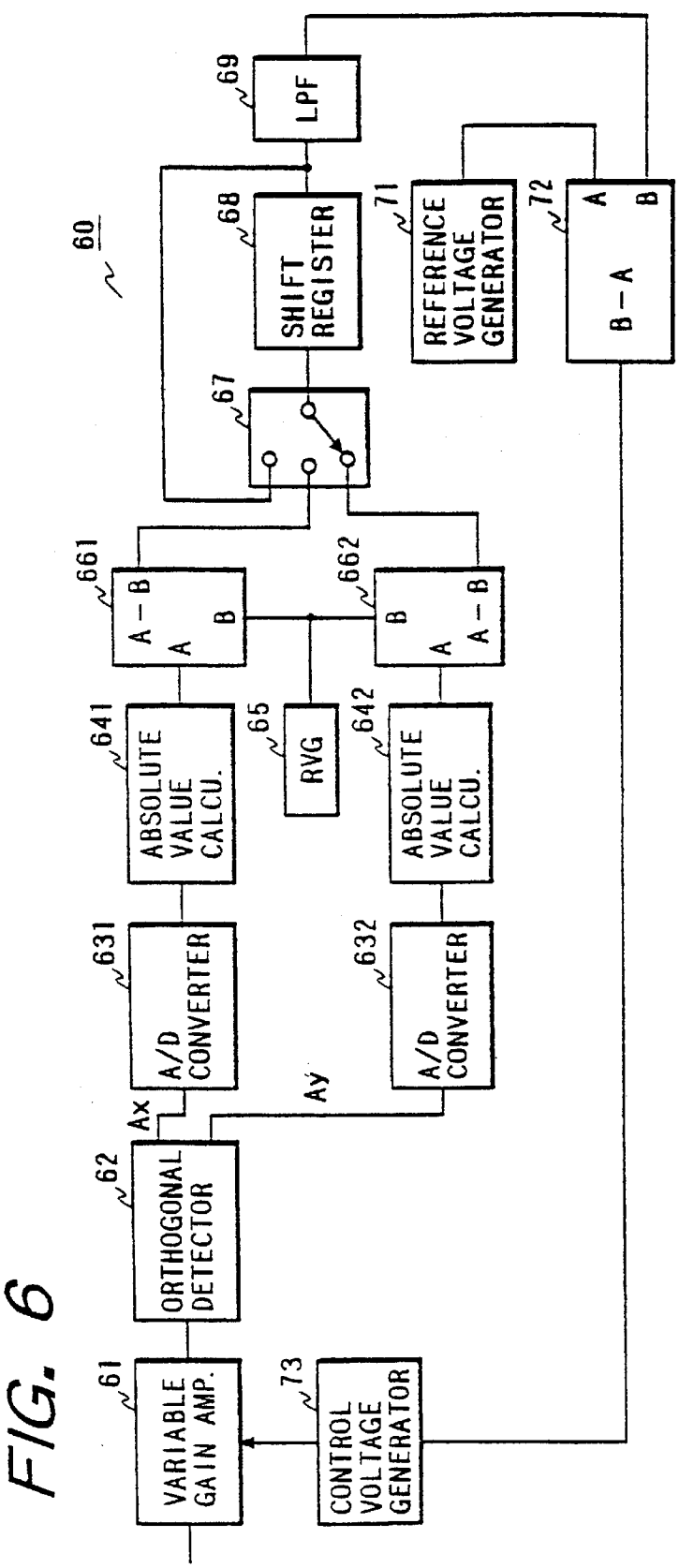
FIG. 6 is a block diagram of a level (or gain) controller in accordance with illustrative Embodiment 3A of the invention.

FIG. 6 is a block diagram of a level (or gain) controller in accordance with illustrative Embodiment 3A of the invention. In FIG. 6, the level controller 60 comprises a variable gain amplifier 61 for providing a level-controlled output in response to a control voltage supplied through a control terminal thereof; an orthogonal detector 62 for resolving the level-controlled output into elements Ax and Ay; A/D converters 631 and 632 for sampling the elements Ax and Ay, respectively, and providing corresponding digital values; absolute value calculators (CALCU.) 641 and 642 for each calculating the absolute value of the input digital value; a reference value generator (RVG) 65 for generating a reference value used for detecting the size of a vector whose elements are defined as the absolute values from the absolute value calculators 641 and 642; subtracters (A−B) 661 and 662 for subtracting the RVG 66 output from the absolute value calculator 641 and 642 outputs, respectively; a switch 67 for connecting one of its three input terminals to the output terminal thereof, two of the three input terminals being connected to the outputs of the subtracters 661 and 662; a shift register 68 for temporarily storing sign bits of the output data from the switch 67, the register 68 output being connected to the other one of the input terminals of the switch 67; a low pass filter (LPF) 69 for smoothing the output voltage of the shift register 68; a reference voltage generator 71 for generating a reference voltage; a subtracter (A−B) 72 for subtracting the reference voltage from the LPF 69 output; and a control voltage generator 73 for generating a control voltage for use in the gain control of the variable gain AMP 61 so as to make the output voltage of the subtracter 72 zero.

In operation, the gain of the variable gain amplifier 61 is so controlled as to cause the vector size defined by the orthogonal detector 62 outputs Ax and Ay to become 1.

Specifically, the output of the variable gain amplifier 61 is resolved by the orthogonal detector 62 into elements Ax and Ay, which are sampled by the A/D converters 631 and 632 into corresponding digital values, which in turn have absolute values calculated in the absolute value calculators 641 and 642, 5 respectively.

Assuming the size of the vector (Ax, Ay) is 1, Ax=cos θ and Ay=sine θ. Since Ax=Ay=$2^{-\frac{1}{2}}$ for a θ=π/4, it is assumed that the RVG 65 generates a reference value of $2^{-\frac{1}{2}}$. Each of the subtracters 661 and 662 subtracts the reference value $2^{-\frac{1}{2}}$ from the absolute value from the calculator 641, 642. Both of the probabilities that the result of the subtraction is positive and that the result is negative are 0.5 regardless of the value of θ as long as $AX^2+Ay^2=1$. If $Ax^2+Ay^2>1$, then the probability of the positive result becomes larger, whereas if $Ax^2+Ay^2<1$, then the probability of the negative result becomes larger.

Accordingly, if sign bits of the subtracter 661 and 662 outputs (0 in case of positive and 1 in case of negative) are stored alternately in the shift register 68 by switching the switch 67 each time of the subtraction operation by the subtracters 661 and 662, 1's and 0's in the shift register 68, are equal in number if the vector size is 1. 0's exceeds 1's if the vector size is larger than 1, and 1's exceeds 0's otherwise. If the input signal is no longer supplied, the current data in the shift register 68 is circulated by causing the switch 67 to output the shift register 68 output or the shift register 68 is so reset as to store the same number of 0's and 1's.

Assume that the shift register 68 makes the output voltage 5V for a sign bit 1 and 0V for a sign bit 0. Then, the output voltage obtained by the LPF 69 averaging the output voltage of the shift register 68 is about 2.5V if the vector size is 1 smaller than 2.5V if the vector size is larger than 1, and larger than 2.5V if the vector size is smaller than 1.

The subtracter 72 outputs the difference obtained by subtracting the reference voltage of, e.g., 2.5V (in this example) from the LPF 69 output voltage, which is negative for a vector larger than 1 and positive for a vector smaller than 1.

The control voltage generator 73 outputs a control voltage to cause the subtracter 72 output voltage to become 0V.

As described above, the level controller 60 can convert a result of the decision on the vector size into a voltage without the need of any D/A converter, permitting a reduction in the size and the power consumption of the circuit.

Embodiment 3B

Figure 7:
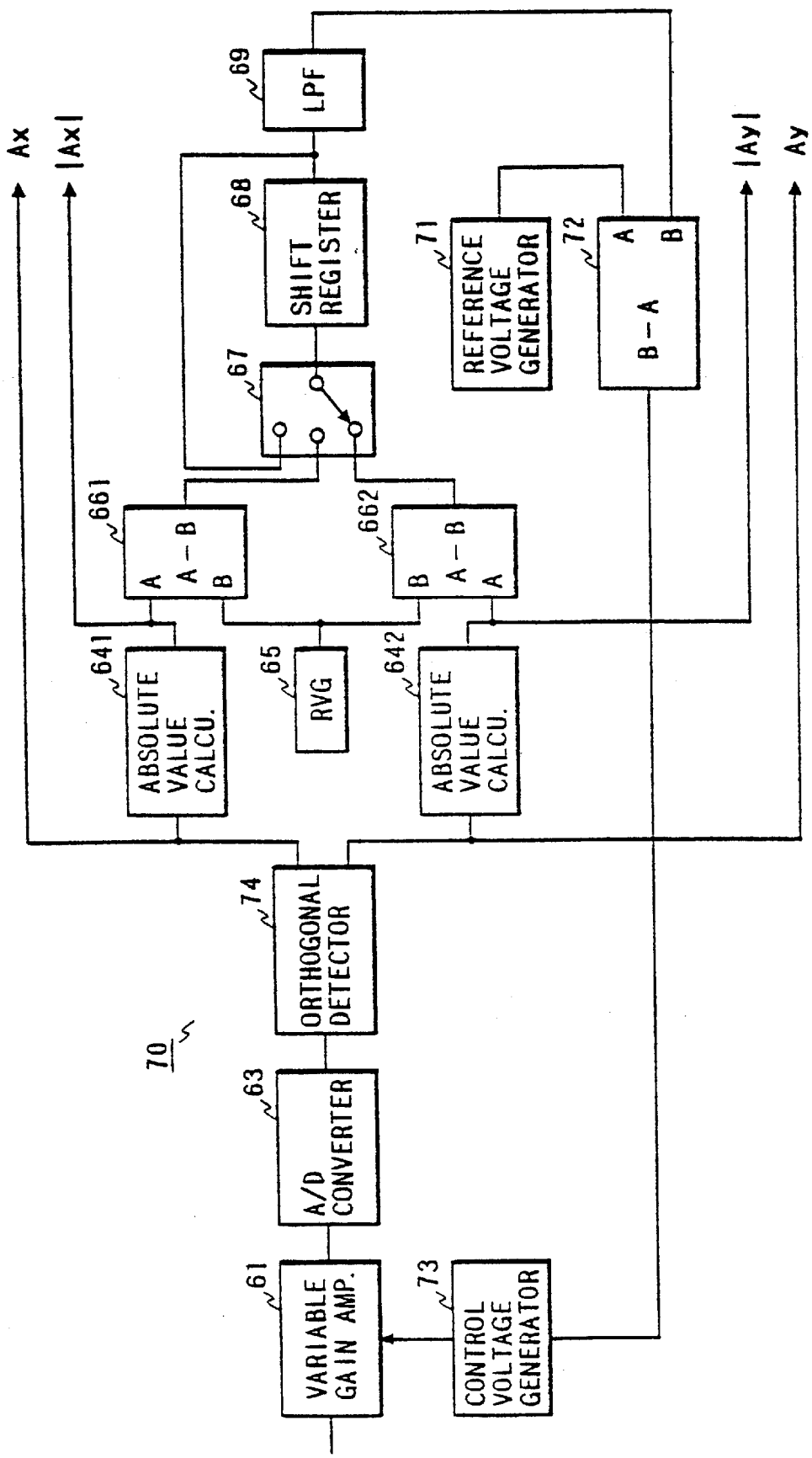
FIG. 7 is a block diagram of a level (or gain) controller with a more simplified arrangement in accordance with illustrative Embodiment 3B of the invention.

FIG. 7 is a block diagram of a level (or gain) controller with a more simplified arrangement in accordance with illustrative Embodiment 3B of the invention.

The level controller 70 of FIG. 7 is identical to the level controller 60 of FIG. 6 except that an A/D converter 63 which is identical to the converters 631 and 632 in FIG. 6 has been placed before a "digital" orthogonal detector 74 and one A/D converter has been eliminated in FIG. 7.

Specifically, an input signal is applied to the variable gain amplifier 61, the output of which is connected to the input of the A/D converter 63, the output of which is connected to the orthogonal detector 62, the Ax and Ay outputs of which are connected to the absolute value calculators 641 and 642, respectively. And, the other part of the level controller 70 is identical to that of FIG. 6.

Since the elements with the same reference numerals are identical to each other in FIGS. 6 and 7, the descriptions of the elements will be omitted.

In operation, a signal which has been its level adjusted by the variable gain amplifier 61 is sampled by the A/D converter 63 into a digital signal. The level controlled digital signal is resolved by the digital orthogonal detector 74 into vector elements Ax and Ay. Since the orthogonal detection is digitally achieved, the elements Ax and Ay are free from errors which would otherwise be involved in orthogonal detection.

According to this illustrative embodiment, there are obtained from an orthogonally modulated signal the normalized components Ax and Ay and their absolute values |Ax| and |Ay|.

Embodiment 2B

Figure 8:
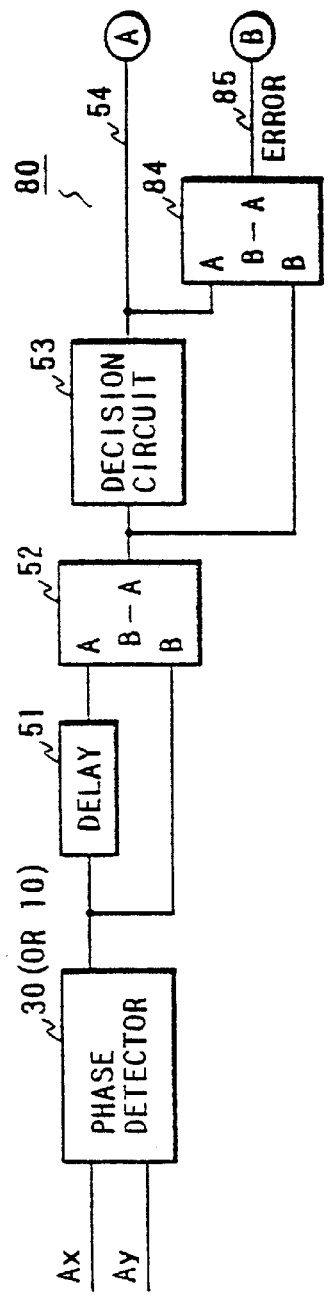
FIG. 8 is a block diagram of a differential detection demodulator with an error output capability in accordance with illustrative Embodiment 2B of the invention.

FIG. 8 is a block diagram of a differential detection demodulator with an error output capability in accordance with illustrative Embodiment 2B of the invention. The differential detection demodulator 80 is identical to that 50 of FIG. 5 except that the former is further provided with a subtracter 84, its subtracting input terminal 84B being connected to the input terminal of the decision circuit 53. Also, a subtracted input terminal of the subtracter 84 is connected to the decision circuit 53 output, and the subtracter 84 provides a decision error output 85.

In operation, the subtracter 84 subtracts demodulated data 54 from the detected differential which is to be input to the decision circuit 53 to provide the decision error output 85.

The decision error can be used for line quality estimation, likelihood necessary for error correction of soft decision, frequency error compensation, diversity, etc. to enhance the reception quality and the accuracy of information necessary for system management.

Embodiment 2C

Figure 9:
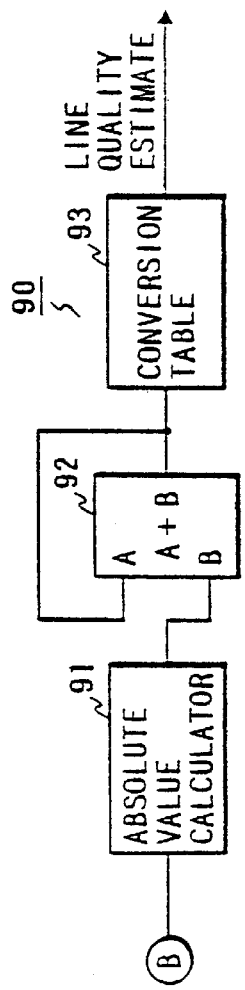
FIG. 9 is a block diagram of a circuit which is to be combined with the differential detection demodulator 80 of FIG. 8 and provides it with a line quality estimate output capability in accordance with illustrative Embodiment 2C of the invention.

FIG. 9 is a block diagram of a circuit which is to be combined with the differential detection demodulator 80 of FIG. 8 and provides it with a line quality estimate output capability in accordance with illustrative Embodiment 2C of the invention.

In FIG. 9, the circuit 90 comprises an absolute value calculator 91 for calculating the absolute value of a decision error output from the subtracter 84 of FIG. 8; an adder 92 for integrating absolute values of decision errors for each time slot; and a conversion table for converting the integrated absolute values into a line quality estimate.

In operation, the decision error output from the subtracter 84 of FIG. 8 has its absolute value calculated in the element 91. The calculated absolute values for each of the time slots are integrated by the adder 92 to yield an integrated value for the slot. Each of the integrated values is converted into a line quality estimate by the conversion table 93.

According to this embodiment, the line quality estimates, which are used for, e.g., a hand over criterion and accordingly have to be precisely calculated, are obtained with a high precision without using any complicated circuit.

Embodiment 2D

Figure 10:
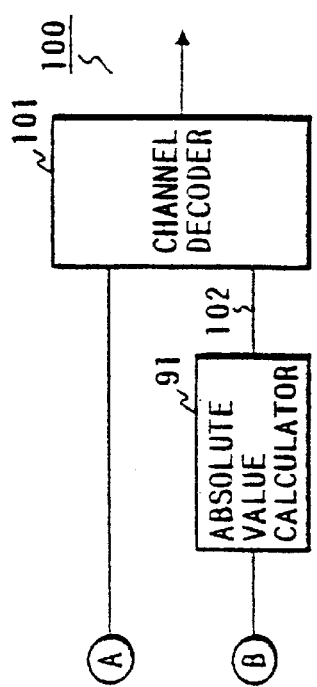
FIG. 10 is a block diagram of a circuit which is to be combined with the differential detection demodulator 80 of FIG. 8 and provides it with a channel decoder in accordance with illustrative Embodiment 2D of the invention.

FIG. 10 is a block diagram of a circuit which is to be combined with the differential detection demodulator 80 of FIG. 8 and provides it with a channel decoder for obtaining decoded data through a soft decision in accordance with illustrative Embodiment 2D of the invention.

In FIG. 10, the circuit 100 comprises an absolute value calculator 91 for calculating the absolute value 102 of a decision error output from the subtracter 84 of FIG. 8; and a channel decoder 101, with its first input connected to the output of the decision circuit 53 in FIG. 8 and its second input connected to the calculator 91 output 102, for supplying decoded data through a soft decision using the calculator 91 output 102 as phase likelihood. The phase likelihood is a value indicative of the likelihood of the decision circuit 53 output. Accordingly, the smaller the phase likelihood is, the more likely the decision circuit 53 output is.

The channel decoder 101 performs decoding through the soft decision by using the phase likelihood. Doing this yields a decoded output of a better error characteristic as compared with a case of using only the decoded data 54 or the decision circuit 53 output.

Embodiment 2E

Figures 11, 12:
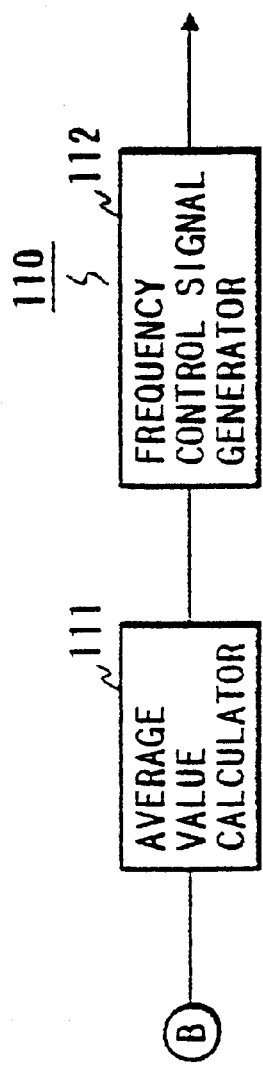
FIG. 11 is a block diagram of a circuit which is to be combined with the differential detection demodulator 80 of FIG. 8 and provides it with a frequency control signal output in accordance with illustrative Embodiment 2E of the invention.
FIG. 12 is a block diagram of a differential detection demodulator with a frequency error correcting capability in accordance with illustrative Embodiment 2F of the invention.

FIG. 11 is a block diagram of a circuit which is to be combined with the differential detection demodulator 80 of FIG. 8 and provides it with a frequency control signal output in accordance with illustrative, Embodiment 2E of the invention.

In FIG. 11, the circuit 110 comprises an average value calculator 111 for calculating an average value of decision errors output from the subtracter 84 of FIG. 8; and a frequency control signal generator 112 for generating a frequency control value in response to the average value.

In operation, decision errors or phase errors output from the subtracter 84 are averaged into an average phase error by the average value calculator 111. Since the phase errors are biased toward the positive side if the frequency has a positive error and toward the negative side if the frequency has a negative error, the average phase error takes a positive value if the frequency has a positive error and takes a negative value otherwise. Since the average phase error is propositional to the frequency error. The frequency error is eliminated by making the average phase error zero.

The frequency control signal generator 112 generates a frequency control value so as to make the average phase error zero. The frequency control value is supplied to a radio section, an orthogonal detector, etc. and used for removing the frequency error.

Embodiment 2F

FIG. 12 is a block diagram of a differential detection demodulator with a frequency error correcting capability in accordance with illustrative Embodiment 2F of the invention.

The differential detection demodulator 120 of FIG. 12 is identical to the demodulator 50 of FIG. 5 except that the former is further provided with a frequency error correcting circuit. In FIG. 12, what the differential detection demodulator 120 has been further provided with is a frequency-correcting subtracter 121 with its B-input terminal connected to the subtracter 52 output and its output terminal connected to the decision circuit 53 output; a subtracter 84 with its A-input terminal connected to the decision circuit 53 output and its B-input terminal connected also to the subtracter 52 output; and an average value calculator 111 with its output connected to an A-input of the frequency-correcting subtracter 121.

In operation of frequency error correction. The phase differential 122 from the subtracter 52 is subtracted with an average phase error 125 supplied from the average value calculator 111, and has its frequency error removed in the frequency-correcting subtracter 121.

The decision circuit 53 outputs decoded data on the basis of the two upper bits of the error-offset phase differential from the frequency-correcting subtracter 121.

The phase differential 122 from the subtracter 52 is subtracted with the decoded data 123 from the decision circuit 53 in the subtracter 84, which outputs a difference 124. The average value calculator 111 averages and supplies the differences 124 to the A-input of the subtracter 121. The average value 125 of the differences 124 again takes a positive value for a positive frequency error and a negative value for a negative frequency error. Since the average value 125 is proportional to the frequency error 124, subtracting the average phase error 125 from the phase differential 122 in the frequency-correcting subtracter 121 causes the frequency error to be removed.

According to this illustrative embodiment, a frequency error is removed from the decoded data, permitting an improvement in the error rate. This is achieved without using a frequency control signal generator only by adding a frequency correcting subtracter and an absolute value calculator and eliminates the need of providing a radio frequency section with a frequency error correcting function.

Embodiment 2G

FIG. 13 is a block diagram of a differential detection demodulator (or differential detector) in a first diversity configuration in accordance with illustrative Embodiment 2G of the invention. In FIG. 13, the differential detector 130 comprises two Branches 1 and 2 or differential detectors 131-1 and 131-2 for each effecting differential detection of input signals Axi and Ayi for the Branch i (i=1, 2) and supplying demodulated data and phase likelihood data; and a selector 132 for selecting one out of demodulated data from the two branches or detectors 131 on the basis of phase likelihood data from the two detectors 131.

Each of the differential detectors 131-1 and 131-2 comprises a differential detector 80 (shown in FIG. 8) which outputs the demodulated data through the line denoted by A encircled with a circle and phase errors through the line denoted by B encircled in a circle; and an absolute value calculator 91 (shown in FIG. 9) for calculating the average of phase errors and supplying the average as the phase likelihood.

The phase likelihood indicates the likelihood of corresponding demodulated data, and shows a smaller value for more likely demodulated data. For this reason, on the basis of a comparison between the phase likelihoods of both branches, the selector 132 selects and outputs the demodulated data of the Branch i the phase likelihood of which is smaller. If, for example, the phase likelihood of Branch 1 is smaller than that of Branch 2, then the selector 132 selects and outputs the demodulated data of Branch 1 or the differential detector 131-1.

In this way, a symbol-switching diversity is realized, enabling an enhancement of the reception quality.

Embodiment 2H

FIG. 14 is a block diagram of a differential detection demodulator (or differential detector) in a second diversity configuration in accordance with illustrative Embodiment 2H of the invention. The differential detector 140 of FIG. 14 is identical to that of FIG. 13 except that a buffer 143 for temporarily storing demodulated data has been inserted along the line denoted by a reference mark A encircled with a circle. An integrator 145 for integrating or accumulating absolute values from the element 91 has been inserted after the absolute value calculator 91 in each branch or differential detector 141-i in FIG. 140.

In operation in each branch or differential detector 144-i, phase likelihood data output from an absolute value calculator 91 are accumulated for each predetermined period of time into a summed phase likelihood 146-i by an integrator 145, and are then output to the selector 142, whereas demodulated data output from a differential detector 30 are stored in a buffer 143 for the same predetermined period of time, and are then output to the selector 142.

The summed phase likelihood accumulated for a predetermined period time indicates the likelihood of demodulated data stored in the buffer 143 for the same predetermined period of time, and shows a smaller value for more likely demodulated data. For this reason, on the basis of a comparison between the summed phase likelihoods of both branches, the selector 132 selects and outputs the demodulated data of the Branch i the summed phase likelihood of which is smaller.

Since the diversity is achieved by using a summed phase likelihood as a criterion, this illustrative embodiment is more effective than that of FIG. 13 especially when the state of line changes slowly.

In this way, a symbol-switching diversity is realized, enabling an enhancement of the reception quality.

Embodiment 4

Figure 15:
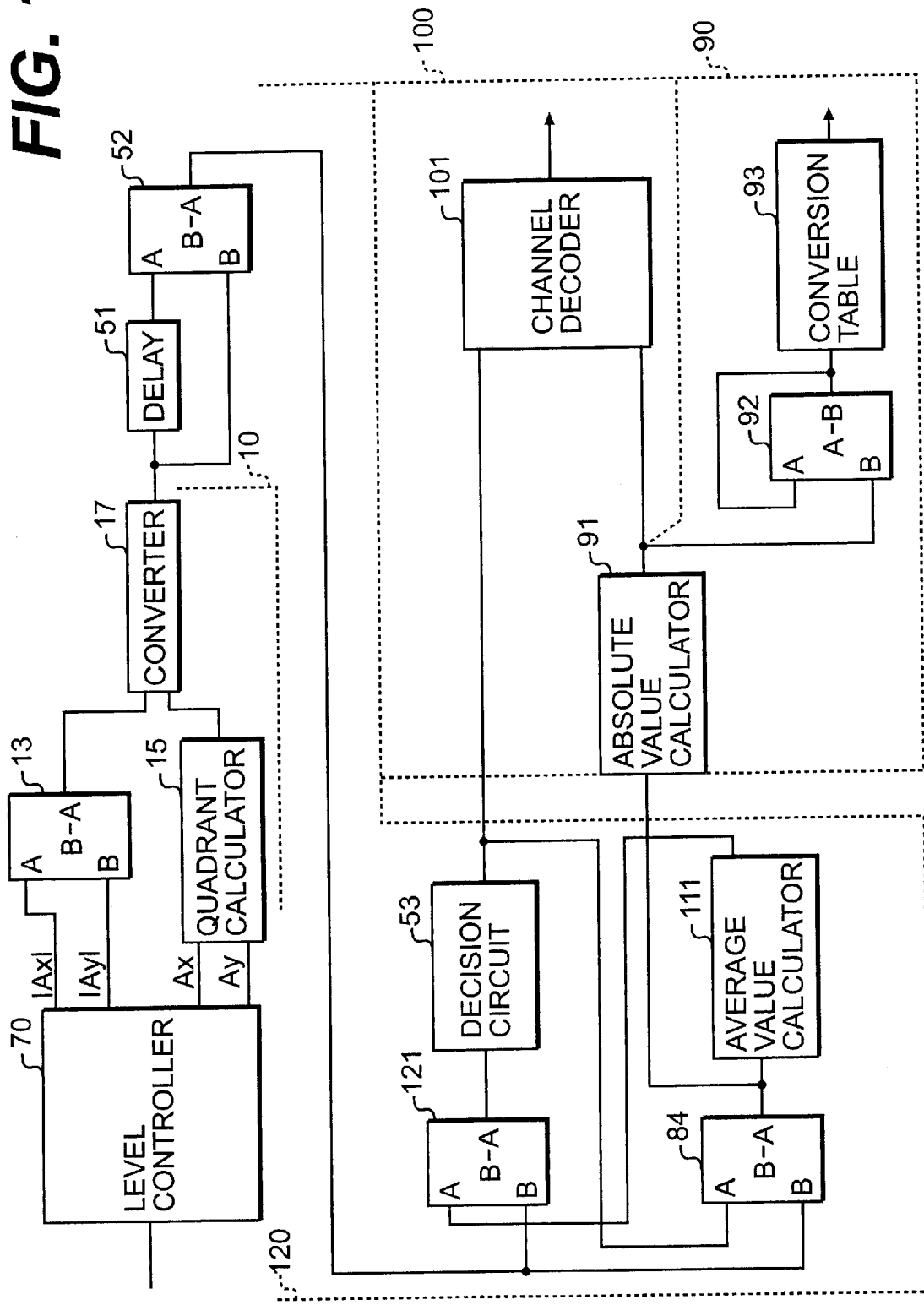
FIG. 15 is a block diagram showing an illustrative embodiment of a data receiver obtained by combining the circuits 5 of Embodiments 1A. 3B, 2C, 2D and 2F.

FIG. 15 is a block diagram showing an illustrative embodiment of a data receiver obtained by combining the circuits of Embodiment 1A (FIG. 1), 3B (FIG. 7), 2C (FIG. 9), 2D (FIG. 10) and 2F (FIG. 12).

This combination permits a further reduction in the number of components.

In FIG. 15, the data receiver comprises the level controller of FIG. 7 for providing normalized components Ax and Ay and absolute values |Ax| and |Ay| of an orthogonally modulated input signal; a subtracter 13; and a quadrant calculator 15; and converter 17. The subtracter 13, the quadrant calculator 15; and converter 17 can calculate arctan (Ay/Ax) using Ax, Ay |Ax| and |AY| Thus, this combination constitutes the arctangent calculator 10 of FIG. 1.

The data receiver further comprises a delay element 51, subtracters 52, 84 and 121, a decision circuit 53 and an average value calculator 111, which constitutes the differential detection modulator 120 of FIG. 12.

The data receiver further comprises an absolute value calculator 91, subtracter 92, conversion for storing line quality values, which constitute the circuit 90 of FIG. 9. And the data receiver further comprises a channel decoder which uses the output of the absolute value calculator 91, which corresponds to the circuit 100 of FIG. 10.

In operation, an orthogonally modulated input signal is so adjusted that the Ax and Ay component satisfy $Ax^2+Ay^2=1$, and a polar coordinate equivalent $4\theta/\pi$ is calculated in the circuit denoted by 10. The polar coordinate equivalent is differential-detected while having a frequency error corrected in the differential detection circuit 120 to yield a frequency corrected decoded data from decision circuit 53 and a phase error from the subtracter 84. The decoded data is subjected to a soft decision in the circuit 100, and final decoded data is output from the channel decoder 101, while the phase error is converted by the circuit 90 into a line quality estimate, which is output from the conversion table 93.

The line quality estimate can be used as a criterion of hand over. Further, phase likelihood data output from the absolute value calculator 91 and a sum output from the adder 92 can be used to realize a symbol-switching diversity as in Embodiment 2G (FIG. 13) and 2H (FIG. 14).

As seen from the above description, the data receiver according to this illustrative embodiment has the feature of:

(1) automatic level control of the input signal;
(2) frequency error removal;
(3) improved error rate through soft decision error correction by a channel decoder; and
(4) high-precision. line quality estimation.

Embodiment 2I

Figure 16:
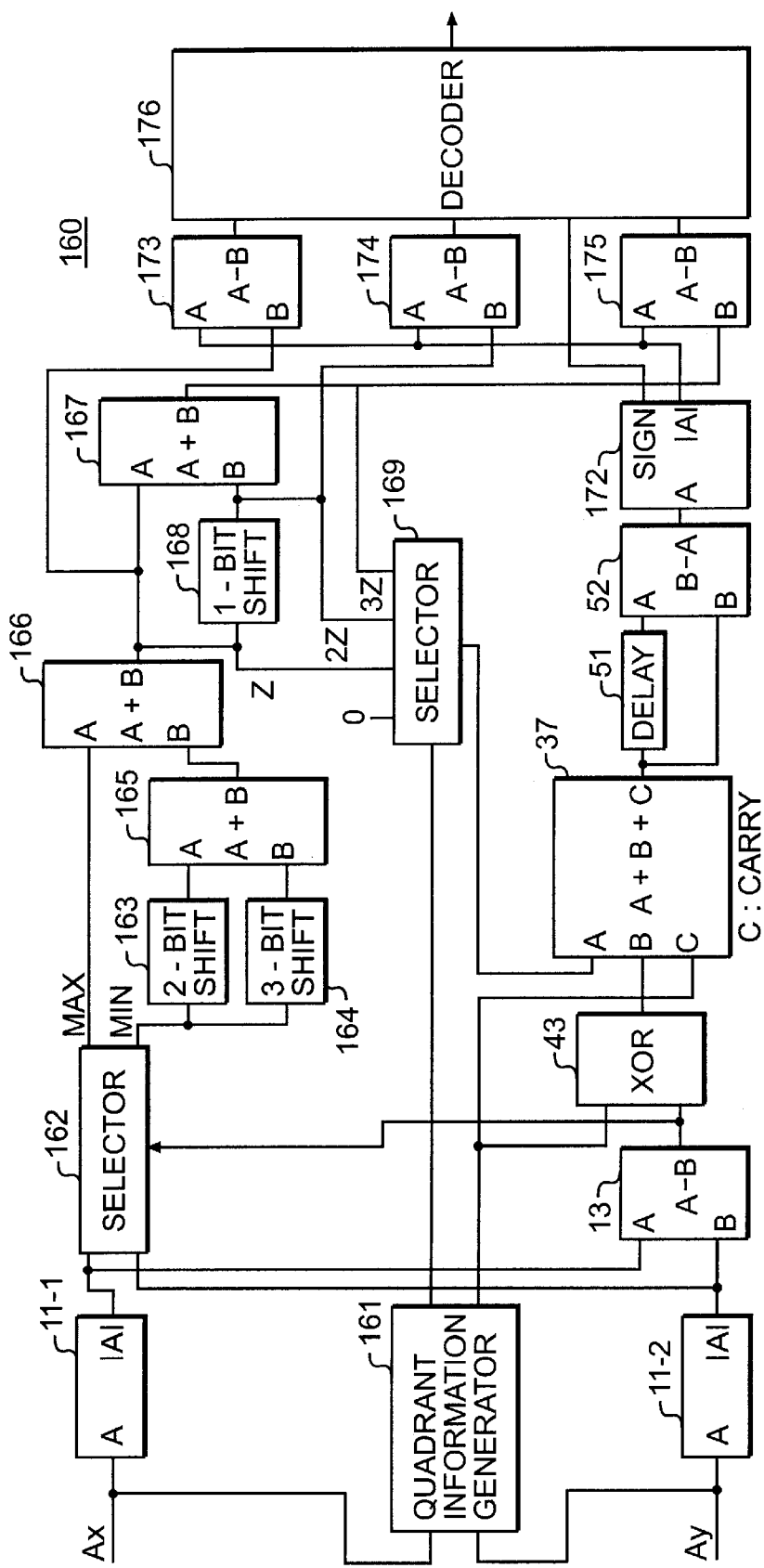
FIG. 16 is a block diagram of a differential detection demodulator with a level controller built-in accordance with illustrative Embodiment 21 of the invention.

FIG. 16 is a block diagram of a differential detection demodulator with a level controller built-in accordance with illustrative Embodiment 21 of the invention. The level controller of this embodiment receives such input signals Ax and Ay that $Ax^2+Ay^2=Z$ ($Z \neq 1$) and calculates $4\theta/\pi$.

Assuming $\theta=\arctan(Ay/Ax)$, from equation (1) we obtain $$(|Ax|-|AY|)/Z \approx \begin{matrix} -(4\theta/\pi)+1: & \text{the first quadrant} \\ (4\theta/\pi)-3: & \text{the second quadrant} \\ -(4\theta/\pi)-3: & \text{the third quadrant} \\ (4\theta/\pi)+1: & \text{the fourth quadrant.} \end{matrix} \quad (3)$$

The error between the two sides of the equation (1) is at most about 1.8. The value Z can be written $$Z \approx \text{MAX}(|Ax|, |Ay|)+\text{MIN}(|Ax|, |Ay|) \times (2^{1/2}-1) \quad (4)$$

$$\text{MAX}(|AX|, |Ay|)+\text{MIN}(|AX|, |Ay|) \times 0.375 \quad (5)$$

Figure 17:
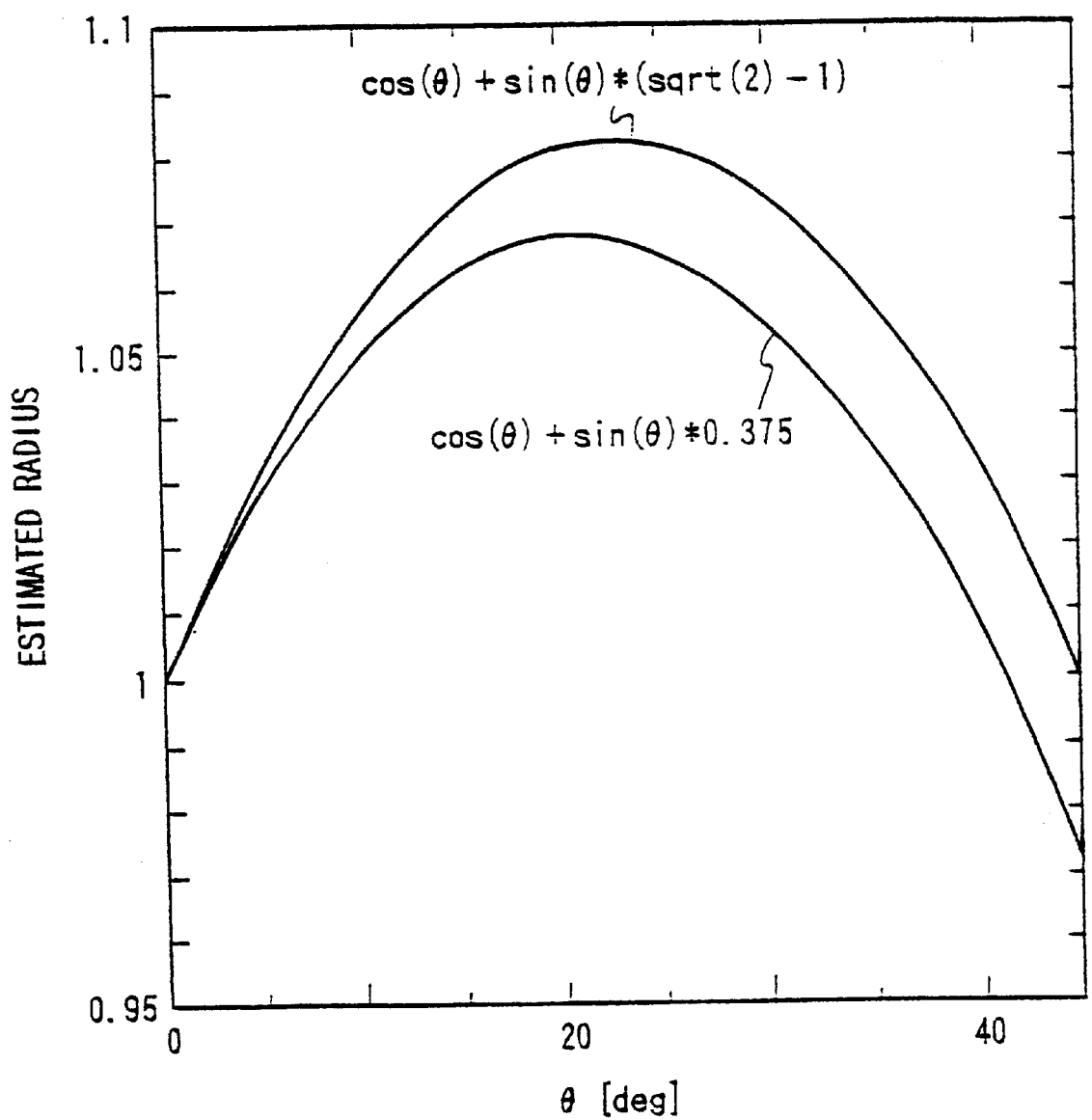
FIG. 17 is a diagram for explaining operation of the level controller of FIG. 16.

FIG. 17 shows the difference between the cases where Z is approximated by equations (4) and (5). If Z is to be calculated in a digital circuit, using the equation (5) is more advantageous because $0.375=2^{-2}+2^{-3}$, that is, 0.375 can be calculated by bit shifting instead of multiplying with 0.375. Thus, the differential detection demodulator 160 is arranged on the basis of the equations (3) and (5).

In FIG. 16, the differential detection demodulator 160 comprises absolute value calculators 11-1 and 11-2 for calculating absolute values of input vector elements Ax and Ay; an arctangent calculating subtracter 13 for calculating the value of |Ax|-|Ay|; a quadrant calculator 161 for supplying first and second quadrant information on the basis of Ax and Ay; a selector 162 for separately supplying the larger and smaller ones of |Ax| and |AY| through output terminals MAX and MIN, respectively, on the basis of the absolute values; a 2-bit shifter 163 for shifting the MIN output 2 bits right; a 3-bit shifter 164 for shifting the MAX output 3 bits right; an adder 165 for adding the outputs of the 2-bit shifter 163 and the 3-bit shifter 164 to providing a value of MIN(|Ax|, |Ay|)×0.375; an adder 176 for adding the selector 162 MAX output and the adder 165 output to provide the value of Z; a 1-bit shifter 168 for shifting the adder 166 output a single bit right to provide the value of 2Z; an adder 167 for adding the adder 166 output and the 1-bit shifter 168 output to provide the value of 3Z; a selector 169 for selectively supplying one of the values 0, Z, 2Z and 3Z according to the second quadrant information from the quadrant calculator 161; a sign determiner 43 for inverting each bit of the subtracter 13 output according to the second quadrant information; a phase offsetting adder 37 for adding the selector 169 output, the sign determiner 13 output and the second quadrant information; a delay element for delaying the phase offsetting adder 37 output for a time period of a symbol; a differential detection subtracter 52 for effecting differential detection by subtracting the delay 51 output from the delay 51 input; an absolute value calculator 172 for outputting the absolute value and the sign bit of the subtracter 52 output; subtracters 173 through 175 for subtracting Z, 2Z and 3Z from the absolute value calculator 172 output, and a decoder 176 for providing decoded data through a combination of codes output from the absolute value calculator 172.

In operation, the differential detection demodulator 160 of this embodiment performs differential detection on (4θZ/π8) obtained by multiplying both sides of the equation showing the relationship between θ and |Ax|−|Ay| by Z, and decodes data expressed by a combination of the signs of the values obtained by subtracting 0, Z, 2Z and 3Z from the absolute value calculator 172.

Specifically, input vector elements Ax and Ay have their absolute values calculated by the absolute value calculators 11-1 and 11-2, respectively. The subtracter 13 calculates |Ax|−|Ay|.

The calculated absolute values are input to the selector 162 and the larger and smaller ones are output through MAX and MIN output terminals under the control of the sign of the subtraction result of the subtracter 13. The MIN output is shifted 2 bits right by the 2-bit shifter 163 and shifted 3 bits right by the 3-bit shifter 164, and added together by the adder 165. The MAX output of the selector 162 and the adder 165 output are added together by the adder 166 to yield the value of Z, which is an approximate value found with Z≈MAX(|Ax|, |Ay|)+MIN(|Ax|, |Ay|)×0.375.

The value of Z is shifted one bit left by the 1-bit shifter 168 to yield the value of 2Z, which is added with the adder 166 output to yield the value of 3Z.

Input signals Ax and Ay are also input to the quadrant information generator 161, which outputs first quadrant information which indicates the quadrant where the vector (Ax, Ay) lies and second quadrant information which is 1 if the vector (Ax, Ay) lies in the first or third quadrant and 0 otherwise.

Each bit of the subtracter 13 output or |Ax|−|Ay| is inverted by the sign determiner 43 if the value of second quadrant information is 1 and output as it is, otherwise. The output of the sign determiner 43 is added by the phase offsetting adder 37 with the second quadrant information from the element 161 and the selector 169 output. Since adjacent output values from the adder 37 are to have their differential taken by the subtracter 52, the selector 169 is so controlled by the second quadrant information as to output the phase difference between the quadrant of the symbol and the first quadrant.

The adder 37 output is supplied to the delay element 51 and the subtracter 52. The delay element 51 delays the adder 37 output for a time period of a symbol to output the previous output value of the adder 37. The current output value from the adder 37 is subtracted in the subtracter 52 with the previous output value of the adder 37. The absolute value calculator 172 outputs the absolute value and the sign bit of the output from the subtracter 52. The decoder 176 is supplied with a sign bit of the input signal of the absolute value calculator 172, and sign bits obtained by the subtracters 173 through 175 subtracting Z, 3Z and 2Z from the absolute value, and outputs decoded data expressed by a combination of the 4 sign bits.

Unlike Embodiment 3A and 3B shown in FIGS. 6 and 7, the present embodiment can effect the level control within a demodulating section without the need of controlling a radio frequency section, permitting a more stable and precise reception.

Embodiment 2J

Figure 18:
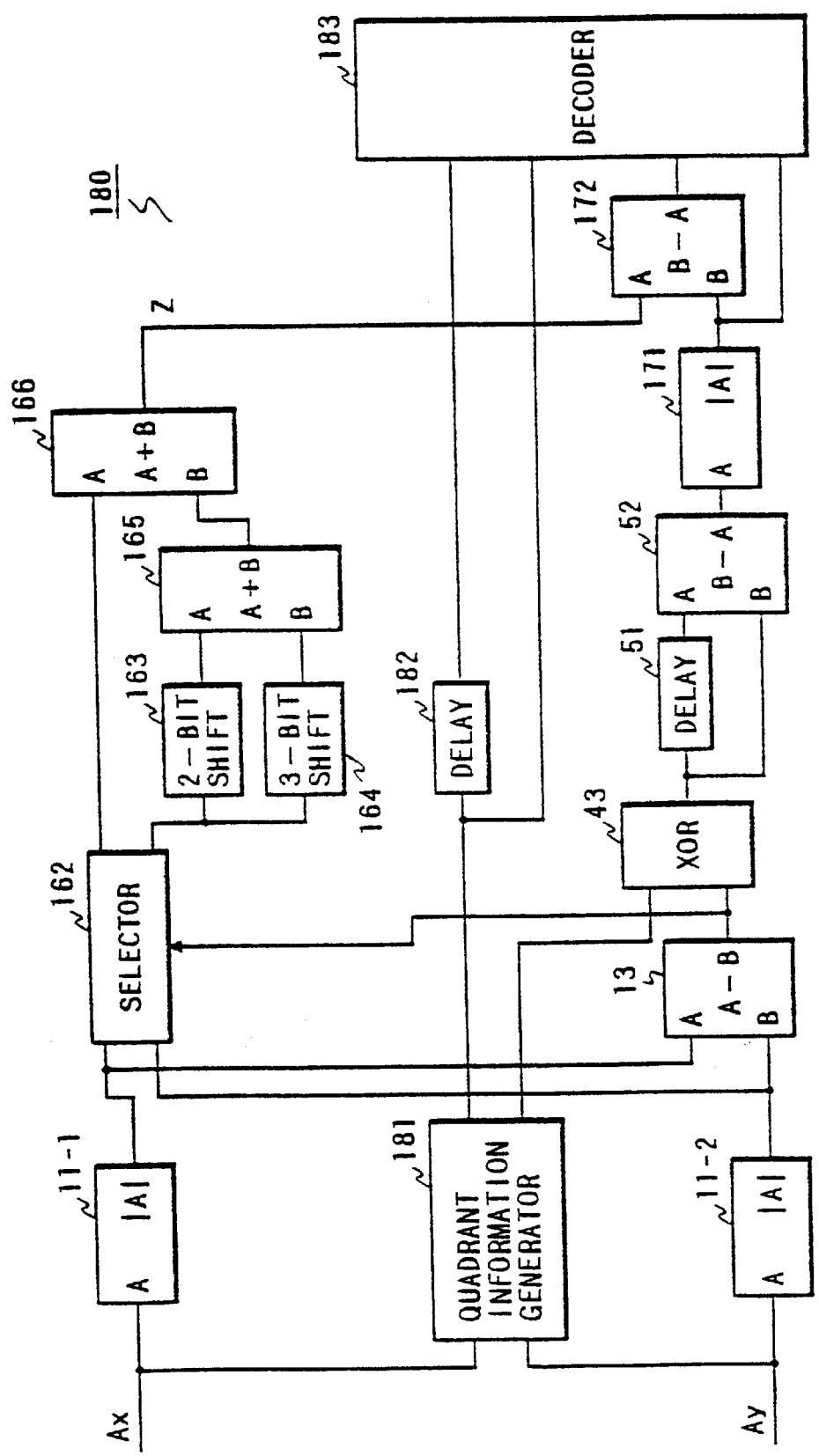
FIG. 18 is a block diagram of a differential detection demodulator with a simplified level adjusting circuit built-in accordance with illustrative Embodiment 2J of the invention.

FIG. 18 is a block diagram of a differential detection demodulator with a simplified level adjusting circuit built-in according to illustrative Embodiment 2J of the invention.

In FIG. 18, the circuit for calculating the value of Z comprises the element 11-1 and 11-2, 13, 162 through 166 and is identical to the corresponding circuit of FIG. 16. The differential detection demodulator 180 further comprises a quadrant information generator for providing a first and a second quadrant information output; a sign determiner 43 for inverting each bit of the subtracter 13 output in response to a first quadrant information output; a delay element 51 for delaying the sign determiner 43 output for a time period of a symbol; a subtracter 52 for effecting differential. detection by subtracting the delay 51 output from the sign determiner 43 output; an absolute value calculator 171 for calculating the absolute value of the subtracter 52 output, a subtracter 172 for subtracting the value of Z from the absolute value; a delay element 182 for storing a first quadrant information output for the just preceding symbol; and a decoder 183 for providing an output signal on the basis of a combination of the signals output from the absolute value calculator 171, the subtracter 172, the quadrant information generator 181 first output terminal and the delay element 182.

In operation, the subtracter 13 output has its sign bit inverted by the sign determiner 43 if the vector (Ax, Ay) lies in the first or third quadrant. The sign determiner 43 output has a value ranging from −Z to Z, and is subtracted in the subtracter 52 with the previous output value of sign determiner 43 which has been delayed for a time period of one symbol by the delay element 51.

The subtracter 52 output has a value ranging from −2×Z to 2×Z. In order to know which of areas from −2×Z to −Z, from −Z to Z, and from Z to 2×Z, the subtracter 52 output belongs to, the absolute value of the subtracter 52 output is calculated by the absolute value calculator 171. The calculated value is in a range from 0 to 2×Z. The subtracter 172 subtracts the value of Z from the calculator 171 output.

Then, the decoder 176 can decode data based on information on which of areas from −2×Z to −Z, from −Z to Z, and from Z to 2×Z the subtracter 52 output belongs to, information given by the quadrant information generator 161 second output on a quadrant to which the vector (Ax, Ay) belongs (second quadrant information output), and a second quadrant information output for the just preceding symbol or the delay 182 output.

A differential detection demodulator according to this embodiment is a more simplified arrangement than that of FIG. 16, permitting a further reduction in the size and the power consumption of a system incorporating a differential detection demodulator according to the embodiment.

Though the illustrative embodiments 2G and 2H of FIGS. 13 and 14 have diversity arrangement comprising two branches, they may have any number of branches.

It should be noted that if a data receiver comprises a plurality of branches, the sampling phases of which are different from each other, the phase likelihood obtained by the arrangement of FIG. 13, the integrated value of phase likelihood obtained by the arrangement of FIG. 14 and the line quality estimate obtained by the arrangement of FIG. 15 can be used as a criterion for the selection of a branch with the optimal sampling phase.

Embodiment 4

FIG. 19 is a schematic block diagram showing an illustrative embodiment of a system 200 capable of receiving digital data which system incorporates a differential detection demodulator 160 of FIG. 16 or 180 of FIG. 18. The system 1 is any such system as a radio receiver, a mobile telephone, etc.

The system comprises an antenna 210 for receiving a radio wave; a RF (radio frequency) portion for converting the received RF signal into a pair of component signals I and Q; a pair of analog-to-digital converters (ADC) for converting the signals I and Q into the above-described digital component signals Ax and Ay; a differential detection demodulator 160 or 180 for converting the signals Ax and Ay into one of predetermined digital values.

In operation, the received RF signal is processed in a well-known manner by not-shown BPF (band pass filter), AGC (automatic gain control), AFC and a not-shown demodulator to be converted into the pair of component signals I and Q in the RF portion 220. The signals I and Q are converted into the digital component signals Ax and Ay by the ADC pair 230. The detector 160 (or 180) converts the digital component signals Ax and Ay into one of the predetermined digital values associated with the signals Ax and Ay in a manner as described in conjunction with FIG. 16 (or 18). The output data from the detector 160 (or 180) is used by the digital data-consuming portion 240.

Many widely different embodiments of the present invention may be constructed without departing from the spirit and scope of the present invention. It should be understood that the present invention is not limited to the specific embodiments described in the specification, except as defined in the appended claims.

What is claimed is:

1. A circuit for calculating a radius Z from input signals Ax and Ay, where $(Ax^2+Ay^2)^{1/2}=Z$, the circuit comprising:

means for separately calculating absolute values of said input signals Ax and Ay;

means for calculating a value of $|Ax|$ and $|Ay|$;

means having input terminals Tx and Ty for $|Ax|$ and $|Ay|$, respectively, and output terminals MAX and MIN for connecting said input terminals Tx and Ty with said output terminals MAX and MIN respectively if a sign bit of said value is 0 and for reversely connecting them otherwise;

a first bit shifter for shifting an output of said terminal MIN 2 bits right;

a second bit shifter for shifting an output of said terminal MIN 3 bits right;

a first adder for adding outputs of said first and second bit shifters;

a second adder for adding an output of said first adder with an output of said terminal MAX to provide a value of Z.

2. A differential detector incorporating a circuit as defined in claim 1, the differential detector further comprising:

a third bit shifter for shifting said value of Z a single bit right to provide a value of 2Z;

a third adder for adding said value of Z to said value of 2Z to provide a value of 3Z;

a quadrant calculator for supplying first and second control signals on the basis of Ax and Ay;

a selector for selectively supplying one of 0, Z, 2Z and 3Z according to said first control signal;

means for inverting each bit of said value of $|Ax|-|Ay|$ according to said second control signal;

an adder for adding an output of said inverting means, said value of $|Ax|-|Ay|$ and a second control signal;

a delay element for delaying an output of said adder for a time period of a symbol;

a differential detection subtracter for effecting differential detection by subtracting an output of said delay element from said output of said adder;

an absolute value calculator for calculating an absolute value of an output from said differential detection subtracter;

subtracters for subtracting Z, 2Z and 3Z from said absolute value from said absolute value calculator; and a decoder for providing decoded data through a combination of codes output from said absolute value calculator.

3. A differential detector incorporating a circuit as defined in claim 1, the differential detector further comprising:

a quadrant calculator for supplying first and second control signals on the basis of Ax and Ay;

a first delay element for delaying said first control signal for a time period of a symbol;

means for inverting a sign bit of said value of $|Ax|-|Ay|$ according to said second control signal;

a second delay element for delaying an output of said inverting means for a time period of a symbol;

a differential detection subtracter for effecting differential detection by subtracting an output of said delay element from said output of said adder;

an absolute value calculator for calculating an absolute value of an output from said differential detection subtracter;

a subtracter for subtracting Z from said absolute value from said absolute value calculator; and a decoder for providing decoded data through a combination of codes output from said absolute value calculator.

4. System capable of receiving digital data, the system comprising:

an antenna for receiving a radio wave and providing a high frequency signal;

means for converting said high frequency signal into a pair of component signals for a symbol;

means for analog-to-digital converting said component signals into corresponding digital component signals Ax and Ay;

detecting means for converting said component signals Ax and Ay into one of predetermined digital values; and means for consuming said one of said predetermined digital values, wherein said detecting means comprises:

means for calculating a radius of said signals Ax and Ay, said radius being assumed to be Z;

a bit shifter for shifting said value of Z a single bit right to provide a value of 2Z;

an adder for adding said value of Z to said value of 2Z to provide a value of 3Z;

a quadrant calculator for supplying first and third control signals on the basis of Ax and Ay;

a selector for selectively supplying one of 0, Z, 2Z and 3Z according to said first control signal;

means for inverting each bit of a value of $|Ax|-|Ay|$ according to said second control signal;

an adder for adding an output of said selector, an output of said inverting means, and said second control signal;

a delay element for delaying an output of said adder for a time period of said symbol;

a differential detection subtracter for effecting differential detection by subtracting an output of said delay element from said output of said adder;

an absolute value calculator for calculating an absolute value of an output from said differential detection subtracter;

subtracters for subtracting Z, 2Z and 3Z from said absolute value from said absolute value calculator; and a decoder for providing said one of said predetermined digital values through a combination of codes output from said absolute value calculator.

5. A system capable of receiving digital data, the system comprising:
- an antenna for receiving a radio wave and providing a high frequency signal;
- means for converting said high frequency signal into a pair of component signals for a symbol;
- means for analog-to-digital converting said component signals into corresponding digital component signals (hereinafter denoted as Ax and Ay);
- detecting means for converting said component signals Ax and Ay into one of predetermined digital values; and
- means for consuming said one of said predetermined digital values, wherein said detecting means comprises:
  - means for calculating a radius of said signals Ax and Ay, said radius being assumed to be Z;
  - a quadrant calculator for supplying first and second control signals on the basis of signals Ax and Ay;
  - a first delay element for delaying said first control signal for a time period of said symbol;
  - means for inverting a sign bit of a value of |AX|−|Ay| according to said second control signal;
  - a second delay element for delaying an output of said inverting means for a time period of said symbol;
  - a differential detection subtracter for effecting differential detection by subtracting an output of said delay element from said output of said adder;
  - an absolute value calculator for calculating an absolute value of an output from said differential detection subtracter;
  - a subtracter for subtracting Z from said absolute value from said absolute value calculator; and
  - a decoder for providing said one of said predetermined digital values through a combination codes output from said absolute value calculator.

* * * * *